LA MONT A. McDOWELL.
AUTOMOBILE DOOR VENTILATOR.
APPLICATION FILED JULY 24, 1916.
1,268,986.
Patented June 11, 1918.
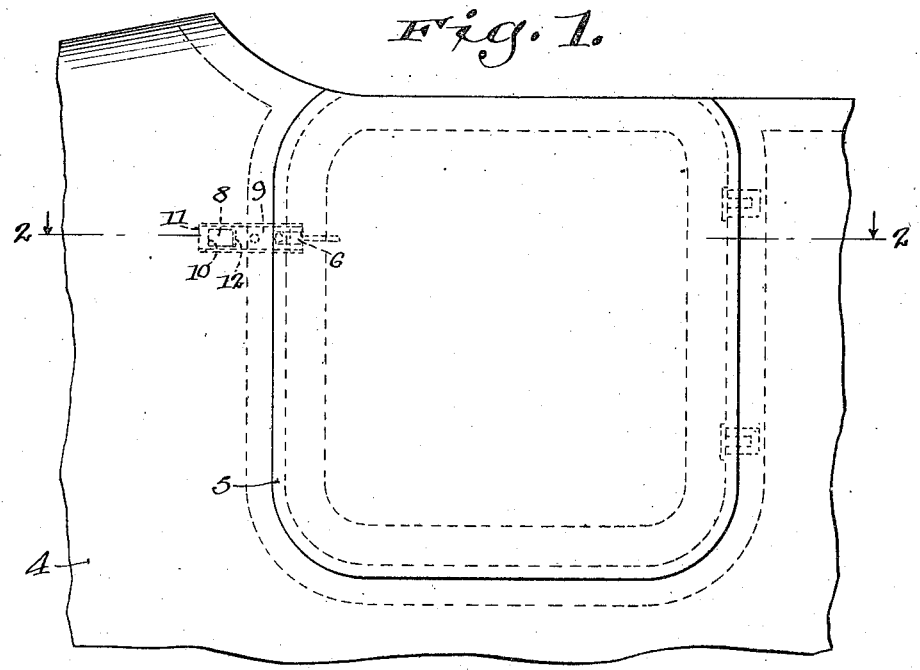
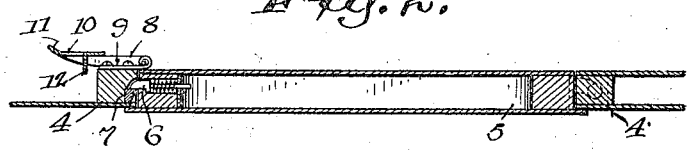
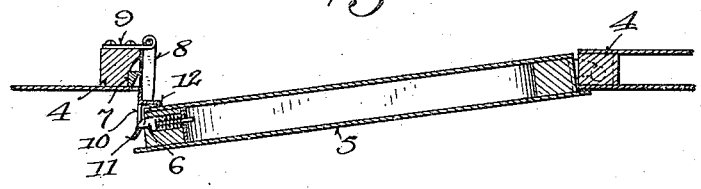
Inventor
La Mont A. McDowell
By Mursell, Keeney & French
Attorneys.

UNITED STATES PATENT OFFICE.

LA MONT A. McDOWELL, OF RACINE, WISCONSIN.

AUTOMOBILE-DOOR VENTILATOR.

1,268,986.  Specification of Letters Patent.  Patented June 11, 1918.

Application filed July 24, 1916. Serial No. 110,893.

*To all whom it may concern:*

Be it known that I, LA MONT A. McDOWELL, a citizen of the United States, and resident of Racine, in the county of Racine and State of Wisconsin, have invented new and useful Improvements in Automobile-Door Ventilators, of which the following is a description, reference being had to the accompanying drawings, which are a part of this specification.

The invention relates to locks more particularly adapted for use on automobile doors.

In automobiles, the body of the car is generally built up to a level with the seats and in hot weather there is very little circulation of air in this part of the car with a resulting discomfiture to the occupants of the car. It was to provide against this that the present invention was designed to provide a lock for the automobile door to hold it in partially open position to permit the ready passage of air into the car and make the partially opened door serve as a ventilator for the body of the car.

The invention is further designed to provide a locking means coöperating with the usual door latch or locking bolt for keeping a door in partially extended position for ventilating purposes.

The invention is further designed to provide a new and improved form of door lock for ventilating purposes.

The invention further consists in the several features hereinafter set forth and more particularly defined by claim at the conclusion hereof.

In the drawings:

Figure 1 is a view of a portion of an automobile body showing the door, the locks being applied thereto in dotted lines;

Fig. 2 is a section taken on the line 2—2 of Fig. 1 showing the door in normally closed position;

Fig. 3 is a section similar to Fig. 2 showing the door in partially open position with the device embodying the invention in operative position.

In the drawing the numeral 4 represents the portion of the body of an automobile provided with a hinged side door 5 which is maintained in normally closed position by any suitable form of door lock consisting of the spring pressed locking latch 6 slidably mounted within the door and the keeper 7, with which the latch 6 engages, mounted on the body of the car. As the present invention is not directed to the particular form of door lock and means for operating the same except that said door lock be of the sliding bolt type further description and details of the same is not thought necessary.

The device embodying the invention consists of a supplemental locking means adapted to coöperate with the usual door latch 6 to hold the door in partial extended position. This means consists of an escutcheon plate 8 hingedly connected to a base plate 9 secured to the body of the car on the inside. This plate 8 is of such a length as to extend outwardly beyond the outside of the car body when in operative position. Said plate 8 is provided with a locking bolt receiving recess or slot 10 and an outwardly curved end 11 at one end of said slot and an inwardly extending flange 12 at the opposite end of said slot.

In its inoperative position the escutcheon plate 8 is swung back against the plate 9 inside the car, as shown in Fig. 2, and in this position will not interfere in any way with the opening and closing of the door 5 and the operation of the usual door lock. When however it is desired to maintain the door in partially open position for ventilating purposes, said door is unlatched and opened outwardly and then the escutcheon plate 8 is swung outwardly to the position shown in Fig. 3. Then the door 5 is swung inwardly, the locking latch 6 engaging the curved end 11 of the plate 8 and being pushed inwardly on the further inward movement of the door until said latch 6 passes said curved end and then moves forwardly into the slot 10, the rear side of the door adjacent the lock abutting against the flange 12 of the plate 8, as shown in Fig. 3. In this position the door is held in partially open position so as to permit the free passage of air through the space between the door and the car body and thus cause the air to circulate through the space inclosed by the sides of the body while the vehicle is running. When it is desired to close the door the locking bolt or latch 6 is moved out of engagement with the slot 10 and the door moved forwardly while the plate 8 is moved backwardly to inoperative position.

The invention thus exemplifies a simple and efficient means which used in connection with the usual locking latch maintains the door in partially open position for the purpose of ventilation.

What I claim as my invention is:

The combination, with the body of an automobile, a door hingedly connected thereto, and a lock for said door including a spring pressed slidably movable latch having a beveled end, of a plate hingedly secured adjacent the door within the body of the automobile and adapted to be swung outwardly therefrom, said plate being provided with a slot for receiving the latch, a beveled end for automatically moving the latch inwardly against its spring when the door is moved against the outwardly swung plate to permit said latch to automatically engage in said slot when the door is moved inwardly, and a stop on the plate for engaging the door when the latch is lockingly engaged with the plate.

In testimony whereof, I affix my signature.

LA MONT A. McDOWELL.

Copies of this patent may be obtained for five cents each, by addressing the "Commissioner of Patents, Washington, D. C."